United States Patent [19]

Siu et al.

[11] Patent Number: 5,528,661

[45] Date of Patent: Jun. 18, 1996

[54] DIAGNOSTIC MECHANISM FOR MONITORING OPERATIONAL STATUS OF REMOTE MONITORING AND TEST UNIT WHICH CONTROLLABLY TEST AND CONDITIONS SUBSCRIBER LINE CIRCUITS

[75] Inventors: Edward K. W. Siu, Simi Valley; Richard L. Walsworth, Westlake Village; James Jollota, Simi Valley, all of Calif.; Alex Knight, Danville, Ind.

[73] Assignee: Harris Corporation, Melbourne, Fla.

[21] Appl. No.: 193,811

[22] Filed: Feb. 9, 1994

[51] Int. Cl.⁶ .......................... H04M 1/24; H04M 3/08; H04M 3/22

[52] U.S. Cl. .................. 379/27; 379/1; 379/10; 379/22; 379/29; 379/31

[58] Field of Search .................. 379/1, 10, 22, 379/27, 29, 31

[56] References Cited

U.S. PATENT DOCUMENTS

| | | | |
|---|---|---|---|
| 4,554,410 | 11/1985 | Furumoto | 379/27 |
| 4,912,755 | 3/1990 | Blood | 379/27 |
| 4,995,070 | 2/1991 | Shin | 379/27 |
| 5,003,573 | 3/1991 | Agah et al. | 379/1 |
| 5,018,184 | 5/1991 | Abrams | 379/29 |
| 5,063,585 | 11/1991 | Shapiro | 379/27 |
| 5,195,124 | 3/1993 | Ishioka | 379/29 |

*Primary Examiner*—Stephen Chin
*Assistant Examiner*—Vijay Shankar
*Attorney, Agent, or Firm*—Charles E. Wands

[57] ABSTRACT

A self diagnostic test routine resident in firmware in a remote, programmable device for testing telephone lines diagnostically examines the operational capability of each of a plurality of prescribed signal processing functions contained within the test device, on a selected one of a 'loop' (effectively continuous) basis, 'automatically'—at a less than continuous but still meaningfully periodic rate, or 'on-demand'—at any time requested by the user. In addition, a running log is maintained of the results of each diagnostic test, and the results of each diagnostic test are compared with a set of thresholds associated with respectively different standards of performance of the test device. As a result of this comparison, the performance capability or status of the device is classified into one of three categories: PASS, MARGINAL, or FAIL, and communicated to system maintenance personnel.

18 Claims, 4 Drawing Sheets

| Test | Diagnostic Test Name | Test (s) Performed |
|---|---|---|
| 1. | DAC Output Test | Dac output, voltage divider network and A/D converter |
| 2. | Voltage Sources and Bridge Test | DAC output and power operational amplifier, resistance measurement source resistors, current shunt resistors, and A/D converter |
| 3. | System Battery Test | System in circuit battery voltage. |
| 4. | C.O. Battery Test | C.O. Battery voltage level. |
| 5. | DTMF Signal Tests | Tone generation and DTMF detect circuitry. |
| 6. | High Impedance Monitor Tests | Tone generation and power boost amplifer circuitry, and the high impedance monitor. |
| 7. | Capacitance Source Resistors Tests | Tone generation and power boost amplifier circuitry, and the capacitance source resistors. |
| 8. | Off hook Circuitry Test | Off-hook detector circuit and the termination resistors. |
| 9. | Capacitance Test | Capacitance measurement capability through the measurement of a delta of three diagnostic capacitors. |
| 10. | Test Bus Leakage Test | The leakage involved with the components or traces on the internal test pair. |
| 11. | Ringer Tests | The amplitude of the external ring signal(s). |
| 12. | Modem Tests | Modem circuit including analog loop back, draw and break dial tone. |
| 13. | Monitor Tests | Dial tone detect circuitry and monitor line hook-up. |
| 14. | Memory Tests | Static RAM accessing capability and CRC test of FLASH memory. |
| 15. | BBM Tests | Data retention in Battery Backed-Up RAM. |

Figure 3

DIAGNOSTIC MECHANISM FOR MONITORING OPERATIONAL STATUS OF REMOTE MONITORING AND TEST UNIT WHICH CONTROLLABLY TEST AND CONDITIONS SUBSCRIBER LINE CIRCUITS

CROSS-REFERENCE TO RELATED APPLICATIONS

The present invention relates to subject matter disclosed in co-pending patent application Serial No. 194,232, filed coincident herewith, by D. Foster et al, entitled "Remote Measurement Unit Containing Integrated Line Measurement and Conditioning Functionality for Performing Remotely Commanded Testing and Conditioning of Telephone Line Circuits," assigned to the assignee of the present application and the disclosure of which is incorporated herein.

FIELD OF THE INVENTION

The present invention relates in general to communication systems, such as telephone systems, and is particularly directed to a mechanism for performing periodic or demand diagnostic testing of the operational capability of each of a plurality of prescribed signal processing functions contained within a remote, programmable test device, such as that described in the above-referenced co-pending application, which device is operative to test and condition network lines and subscriber termination equipment.

BACKGROUND OF THE INVENTION

Measuring and test equipment currently employed by telephone service providers customarily contain a variety of conditioning and signal generation capabilities, which enable service and maintenance personnel to apply a prescribed number of electrical stimuli to a line (a subscriber loop), for the purpose of trouble-shooting the line and measuring its performance.

A relatively simplified non-limiting block diagram of a telephone network containing such equipment is shown in FIG. 1 as comprising a distribution of a plurality of (microprocessor-controlled) remote measurement units (RMUs) 11, which are installed at a plurality of sites geographically remote with respect to each other and a supervisory site 12.

An RMU 11 includes various components, such as analog-to-digital converter (ADC) and digital-to-analog (DAC) converter units, and tone generation and electrical conditioning circuitry which, under the control of a firmware-resident measurement and test mechanism employed by an on-board processor (microcontroller), selectively transmit prescribed test signals to the line, and may also condition the telephone line with electrical circuit parameters, that allow an associated line measurement unit to conduct line measurements and thereby determine the current state of the line and its ability to successfully perform as intended.

For this purpose, each RMU 11 is typically of the type that conforms to computer interface requirements defined in Issue 3 of AT&T Publication KS-23253, and contains internal firmware which is operative to perform various test operations on network lines 13 and (subscriber) termination equipment 15, under the control of one or more host computers, video display terminals (VDTs) or data terminal units (DTUs) 21 at a supervisory site 12, which have the capability of accessing the remote test equipment 11 through attendant modem devices 23 and 24, such as industry standard Hayes 'AT'-compatible 300/1200 units, that are linked to a central office 25.

In order to ensure that the test device installed at the remote site is functioning properly, it is customary practice to monitor the performance capability or 'health' of the device by occasionally taking it off-line, and performing test diagnostics on its own internal components. Unfortunately, the manner in which the performance capability of such test devices has been monitored in the past does not readily provide the system user with a significant amount of useful diagnostic information in the event of an anomaly.

More particularly, it is customary practice to examine operational capability of such equipment, either on a very infrequent basis (e.g. every six months to a year), or in the event of a manifest (e.g. catastrophic) failure. Otherwise, it is simply assumed that the device is operating correctly and is expected to continue to do so. Because such 'health' evaluation procedures do not track malfunction history of the device in a manner that provides a statistically meaningful indication of its performance, there is no way of knowing whether or not the device is likely to incur a degradation of performance or what possible or probable failure may take place.

SUMMARY OF THE INVENTION

In accordance with the present invention, the above-enumerated shortcomings of conventional methodologies for performing diagnostics on telephone line test equipment are effectively obviated by a new and improved mechanism, which diagnostically tests the operational capability of each of a plurality of prescribed signal processing functions contained within a remote, programmable test device, on a selected one of a 'loop' (effectively continuous) basis, 'automatically'—at a less than continuous but still meaningfully periodic rate, or 'on-demand'—at any time requested by the user. In addition, a running log is maintained of the results of each diagnostic test, and the results of each diagnostic test are compared with a set of thresholds associated with respectively different standards of performance of the test device. As a result of this comparison, the performance capability or status of the device is classified into one of three categories: PASS, MARGINAL, or FAIL, and communicated to system maintenance personnel.

In order to be categorized as having a PASS status, the results of each diagnostic test must satisfy a first, minimum tolerance criterion with respect to the threshold. To be categorized as having a MARGINAL status, the results of each diagnostic test must satisfy a second tolerance criterion that is less restrictive than the minimum, but is still within acceptable operating limits for the test device. Any diagnostic test that does not satisfy the first, minimum tolerance criterion but meets the marginal value will cause the overall status of the device to be categorized as MARGINAL. When the status of a device is MARGINAL, the device is kept in service; however, the user is advised by its MARGINAL status that its performance, while acceptable, is not optimum. Finally, if the result of any diagnostic test fails to satisfy both the first and second tolerance criteria, the status of the device is categorized as FAIL, and the device is taken off line for evaluation.

BRIEF DESCRIPTION OF THE DRAWINGS

FIG. 1A is a simplified block diagram showing the interconnection of a remote terminal with a line test and conditioning device described in the above-referenced co-pending application;

FIG. 3 is a non-limiting list of self diagnostic tests for measuring the performance capabilities of a telephone line test device.

DETAILED DESCRIPTION

Figure 1:
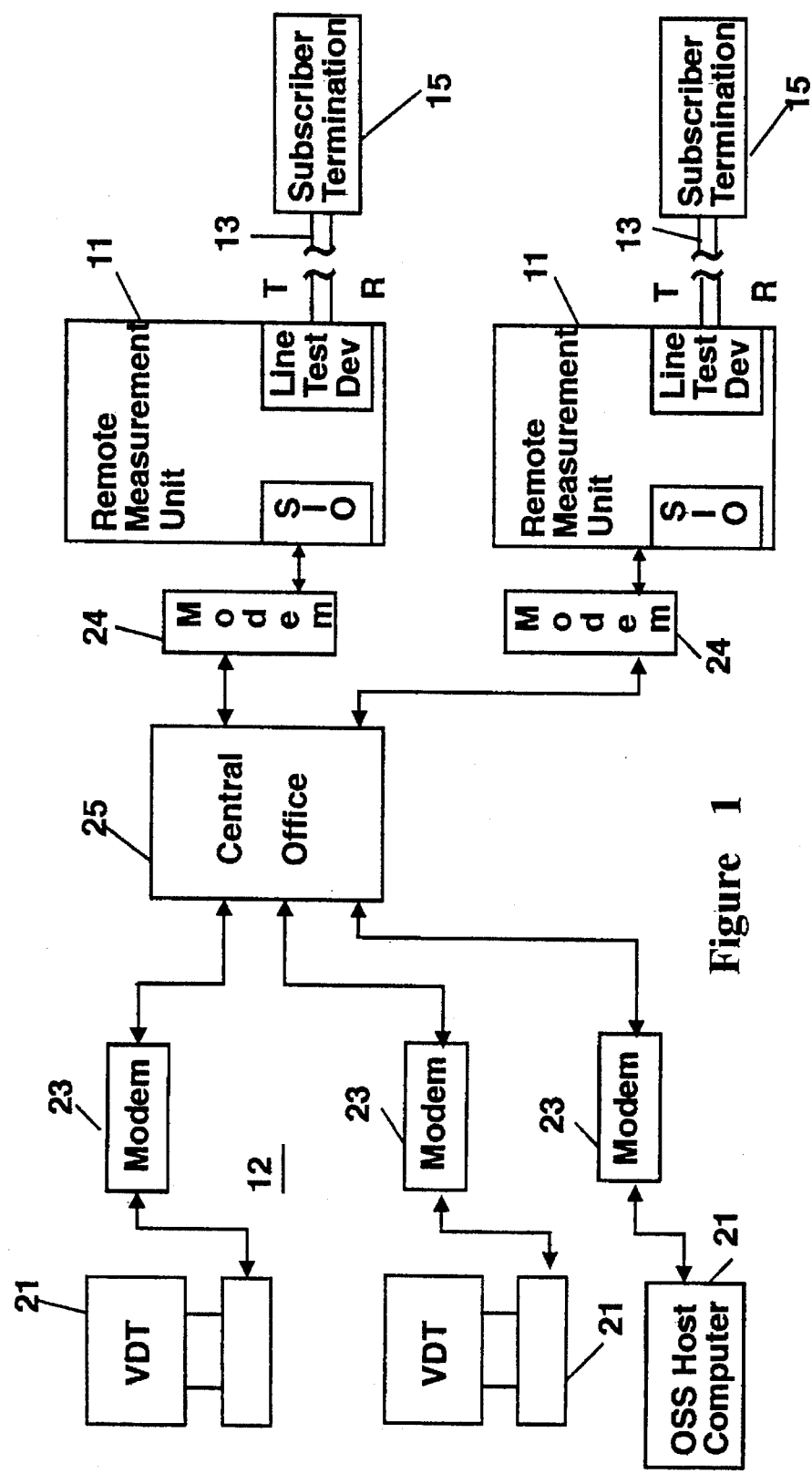
FIG. 1 diagrammatically illustrates an example of a telephone network in which a plurality of (microprocessor-controlled) remote measurement units are installed at a plurality of sites geographically remote with respect to each other and a supervisory site.
Figure 1:
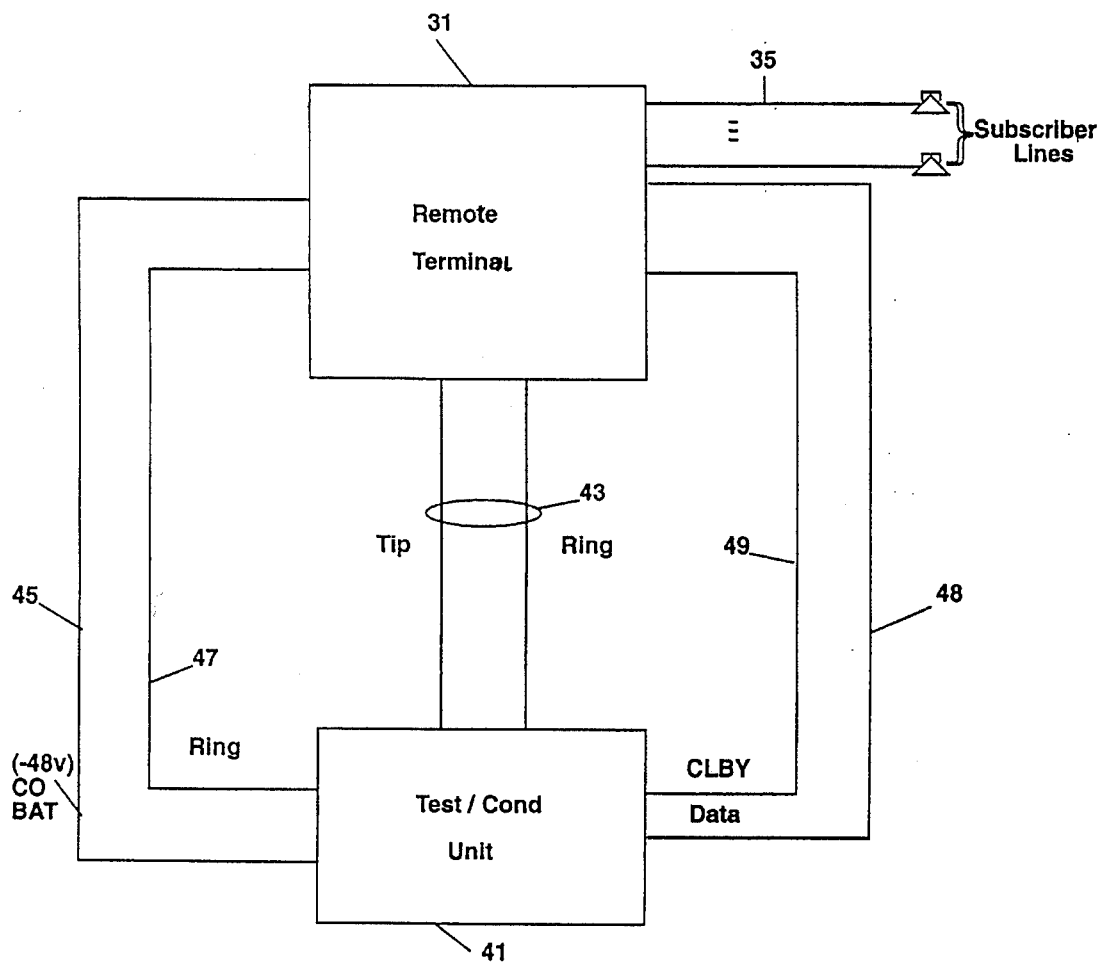

Before describing in detail the diagnostic testing mechanism in accordance with the present invention, it should be observed that the present invention resides primarily in what is effectively a prescribed augmentation of the control software of the remote test unit's microcontroller, which enables the test unit to perform self diagnostic testing of the operational capability of each of a plurality of prescribed signal processing functions contained within the test device on a selected one of a 'loop' basis, 'automatically' at a periodic rate, or 'on-demand', as delineated above The details of the circuitry of the test device is otherwise essentially unaffected. Consequently, the configuration of the test device and the manner in which it is interfaced with other communication equipment of the telephone network have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

Still, although the diagnostic testing methodology of the present invention has applicability to a diversity of measurement and test devices, for purposes of providing a practical, but non-limiting, example of measurement and test equipment with which the present invention may be used, in the description to follow, reference will be made to various test operations that may be invoked in the line test and conditioning device described in the above-referenced co-pending application.

FIG. 1A is a simplified block diagram showing the interconnection of such a line testing and conditioning device with a remote terminal. In particular, FIG. 1A shows a remote terminal 31, such as that employed in a digital loop carrier (DLC) system, to which a plurality of subscriber lines 35 are connected. The line testing and conditioning unit is shown at 41 as being connected to the tip and ring portions of a test pair 43, by way of which the test and conditioning device may perform measurements on a given subscriber line. Central office (–48VDC) battery is supplied by way of a battery line, and ringing signals are coupled via ringing signal line 47. Also shown are two connected phone lines—a data line 48 and a callback line 49.

As pointed out in the above-referenced application, the remote measurement unit is equipped with a number of measurement and conditioning routines that are stored in reprogrammable memory, and are selectively executable, under the control of an internal processor, in response to commands issued from a remote command site. The architecture of such a remote measurement unit is configured so that a virtual remote measurement unit (RMU) and a virtual metallic access unit (MAU) that may be individually accessed and controlled are integrated together in a single device. The RMU operates primarily as a test head that performs mechanized loop testing (MLT) tasks, while the MAU is operative to impart prescribed electrical conditions to a specified line circuit.

When controllably accessed to operate as a virtual RMU, the unit responds to instructions from a command site (e.g. a loop maintenance operations system) and performs single-line demand tests on a line provided by a pair gain system. Included within the RMU functionality is its ability to measure AC and DC voltage and current, and three way resistance and capacitance (between tip and ground, ring and ground, and tip and ring). With this testing capability, the RMU provides MLT type features for remote subscriber loops which are not otherwise accessible by MLT units in a central office. The RMU can also analyze rotary dial pulses, dial tone, and dual tone multi-frequency (DTMF) tones. It can also measure signal transmission levels, generate test tones, and allow test personnel to establish callback and alternatively monitor, apply ringing, talk and perform tests on a separate telephone line.

To operate as an MAU, the unit may receive commands from a direct access test unit (DATU) and performs line conditioning functions on the test line provided by the pair gain system. When operating in the MAU mode, the system may open the line, it may shunt tip to ring, or it may shunt either or both of tip and ring to ground. It may also apply high-level metallic tones to tip and ring, or single-sided tones individually to the tip or ring side of the line. In addition, it may cause a line condition to be maintained on the line for a prescribed period of time following disconnect.

Pursuant to the present invention, operational capability of each of a plurality of prescribed signal processing functions contained within the test device are examined on a selected one of a 'loop' (effectively continuous) basis, 'automatically'—at a less than continuous but still meaningfully periodic rate, or 'on-demand'—at any time requested by the user. The results of each diagnostic test are compared with a set of thresholds associated with respectively different standards of performance of the test device. As a result of this comparison, the performance capability or status of the device is classified into one of three categories: PASS, MARGINAL, or FAIL, and communicated to system maintenance personnel.

The self diagnostic test mechanism of the present invention may be invoked in a selected one of three modes of operation: 1- DEMAND; 2- AUTOMATIC; and 3- LOOP. DEMAND diagnostics may be requested by a user who logs in by way of a modem port, or by a user who has direct access to a local port and who logs in as a human administrator. Through an attendant display, the results are provided directly to the accessing user. AUTOMATIC diagnostics are driven by a software timer that has been loaded into the operating system resident in the microcontroller's program memory and is repeatedly executed at periodic intervals (e.g. every twelve hours). LOOP diagnostics may be invoked by the toggling of a hardware switch. During boot-up, the unit determines that the system is in the LOOP diagnostics mode and therefore triggers a timer to run continuously. Each time that the timer is triggered, the set of diagnostics will be called.

Figure 2:
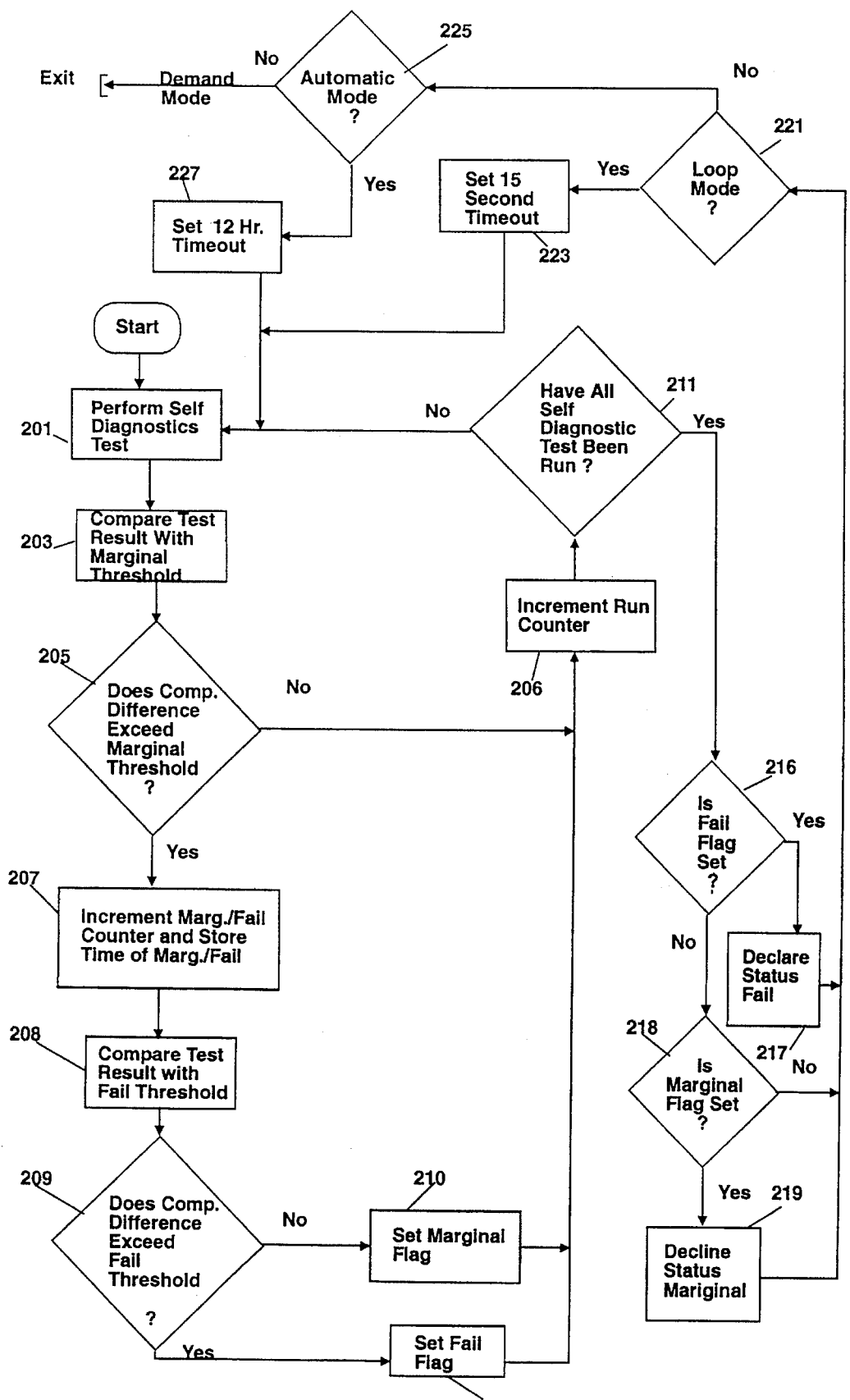
FIG. 2 is a processing sequence flow of respective steps of the diagnostic test procedure of the present invention.

Respective steps of the diagnostic test procedure itself, whether it be demand, automatic, or loop mode, are shown in the processing sequence flow of FIG. 2. The respectively different aspects of the three modes of execution of the diagnostic routine of the invention will be described below. It should be noted that the tests themselves are not limited to any specific test or group of tests, and may include the conventional exercising of or application of prescribed electrical stimuli to various signal processing components and line characteristic measurement devices contained in the test unit, with the outputs of such components and devices being accessible via test points provided for the purpose, as is customary in the technology.

For purposes of providing a non-limiting example, FIG. 3 lists a typical sequence of (fifteen) self diagnostic tests that may be employed to measure the performance capabilities of a number of components customarily employed by a test device to measure and test one or more telephone line circuits. It should be observed, however, that the test routine of the present invention is not limited to this set of self diagnostics. It is equally applicable to a greater or less number of tests that may be used to check the performance capability of one or more of the test unit's components. The diagnostics listed in FIG. 3 provide a representative sequence that ensures a reasonably complete exercising of the equipment with respect to its spectrum of operational functionality. The manner in which the integrated line test and conditioning unit described in the above-identified application executes each of the diagnostics listed in the table of FIG. 3 will be described below.

Referring first to FIG. 2, at step 201, a respective one of a series of self diagnostic tests, such as those listed in FIG. 3 is performed. For each diagnostic test, a digital signal value representative of the diagnostic result is stored. In step 203, the test result value is compared with a first of two performance criteria for the respective test of interest. As described previously, these performance criteria are comprised of a MARGINAL threshold and a FAIL threshold.

More particularly, in step 203, the digital code value that represents the exercised component's output response to the test stimulus (e.g. in diagnostic test 5 (FIG. 3), the appropriate hexadecimal codes representative of input tone pairs generated by the microcontroller and applied to the DTMF decoder under test) is compared with a stored reference (code), representative of a first 'within preferred limits' (or MARGINAL) tolerance. By 'preferred limits' or MARGINAL tolerance is meant that the first threshold has been preselected to define a preferred level of performance within which that aspect of the test unit under test is considered to be effectively optimal or the highest expected level of performance.

Next, in step 205 the routine queries whether the test result exceeds the MARGINAL tolerance threshold. So long as the difference code output from comparison step 203 is no greater than this optimal threshold, then a query step 205 provides an output status word 'PASS' indicating that this diagnostic test has been successfully passed, and the routine transitions to step 206, which increments a test run softcounter. The routine then transitions to query step 211 to determine whether all the tests of the self diagnostic sequence have been performed. If the answer to step 211 is NO, then, in step 213, the routine increments the test number to the next diagnostic and then loops to step 201 to perform the next test.

If the difference code output from comparison step 203 is greater than the first threshold (the answer to query step 205 is YES), it is inferred that, for the test of interest, the operating performance of the RMU is less than optimum (either marginal at best, or failed) and the routine transitions to step 207, which increments a (marginal/fail) anomaly soft-counter and stores the time of occurrence of the no-pass event.

Next, in step 208, the routine compares the digital code value that represents the exercised component's output response to the test stimulus with a second stored reference (code), representative of a 'beyond acceptable limits' (or FAILED) tolerance. By 'beyond acceptable limits' or FAILED tolerance is meant that the second threshold (e.g. some prescribed value down from the first threshold) has been preselected to define a level of performance, within which that aspect of the test unit under test will provide a measurement output that is less accurate than the one that does not exceed the first threshold, namely a less than highest expected level of performance, but still not so severe as to detrimentally affect performance. Beyond this threshold, measurement results are considered to be unreliable.

Next, in step 209, the routine queries whether the test result exceeds the FAIL tolerance threshold. So long as the difference code output from comparison step 208 is no greater than this second threshold, then step 209 provides an output status word 'MARGINAL' indicating that although the test comparison output has exceeded the first (optimum performance) threshold, it is still within acceptable or MARGINAL limits defined by the second threshold. In this case, at step 210, a MARGINAL flag is set, and the routine transitions to step 206 which increments the run counter, and then proceeds to query step 211 to determine whether all the tests of the sequence have been performed, as described above.

If the answer to step 209 is YES, however, indicating that the difference code exceeds the FAIL threshold, then the routine transitions to step 212, which sets a FAIL flag, indicating that the self diagnostic test being run has exceeded both the first and second thresholds, so that it is not within acceptable limits of performance of the RMU. The routine then transitions to step 206 which increments the run counter, and then proceeds to query step 211 to determine whether all the tests of the sequence have been performed, as described above.

Eventually, the answer to step 211 is YES (with a MARGINAL or FAIL flag possibly set for one or more of the diagnostics of the self test sequence). When the answer to step 211 is YES, the process transitions to step 216 for the purpose of calculating an overall diagnostics status word based upon the setting of any MARGINAL of FAIL flag, referenced above.

More specifically, step 216 checks as to whether, for any self diagnostic, a FAIL flag has been asserted. If the answer to step 216 is YES (at least one of the self diagnostics has caused a FAIL flag to be set), then, in step 217, the overall status of the RMU is declared to be FAILED, in response to which the microcontroller illuminates a FAILED display device (e.g. front panel light emitting diode) and takes the test device out of service, thereby preventing any measurement tests from being conducted by the unit. If the answer to step 216 is NO, the routine transitions to step 218, to determine whether, for any self diagnostic, a MARGINAL flag has been set. If the answer to step 218 is YES (at least one of the self diagnostics has caused a MARGINAL flag to be set), then, in step 219, the overall status of the RMU is declared to be MARGINAL. (As pointed out previously, MARGINAL status indicates to users that the RMU is not able to provide very accurate measurement results, yet its performance is not so severe as to warrant its being taken out of service, so that the RMU is still available for use.)

If the answer to query step 218 is NO or, if YES, upon completing step 219, the routine transitions to query step 221, to determine whether the current mode is LOOP mode. If the answer to step 221 is YES, a very short (e.g. 15 second) time-out is executed in step 223 and then the self diagnostic routine is restarted in step 201. If the answer to step 221 is NO, the routine transitions to query step 225, to determine whether the current mode is AUTOMATIC mode. If the answer to step 223 is YES, a prescribed repeat interval time out (e.g. 12 hours) is executed in step 227. After the (12 hour) time-out, the self diagnostic routine is restarted in step 201. If the answer to step 225 is NO, implying a DEMAND mode of self diagnostic test, the routine exits.

The manner in which the line test and conditioning unit described in the above-referenced co-pending application carries out respective self diagnostics for the respective tests listed in FIG. 3 will now be described. It should be observed, however, that the tests listed are only given as examples and may also be performed for other equipments, as long as the circuit architecture of such equipment possesses the requisite signal processing functionality described.

1. DAC output test.

A programmable DC voltage is programmed by a resident digital-to-analog converter (DAC) and the voltage level is routed through a set of input/output devices and relay circuits to a measurement circuit. The known DC voltage is then measured, and the measurement result is compared with the known value against a set of thresholds, to determine whether the result is passed, marginal or failed as described above with reference to FIG. 2.

2. Voltage Sources and Bridge Tests.

A variety of DC voltage signals are generated by the DAC and the signal is then channeled through a set of source resistors, one resistor per set, and routed to a measurement circuit. The DC current is measured and the result is compared with a threshold value, as described above. This test serves to verify the accuracy of the source resistors (used in line resistance measurements).

3. System battery Test.

An on-board battery (e.g lithium battery), which is used as a back-up power supply for (random access) memory, is routed by the input/output circuitry to the measurement circuitry. The battery voltage is measured and compared against a threshold. This test ensures that the battery is good enough for back-up.

4. CO Battery Test.

CO battery provides an external stimulus from the remote terminal of the digital loop carrier to one of the ports of the test device. This stimulus is used by the device to perform prescribed functions, one example of which is powering the subscriber loops. The signal is routed to the measurement head, measured and compared with a threshold. This test serves to verify that a proper site installation of the equipment has been achieved and that the signal is available for use by the device.

5. Dual Tone Multi-frequency (DTMF) Signal Tests.

The test device described in the above-referenced co-pending application is capable of generating tones of various frequencies by means of system clocks and counter circuitry. The device is operative to detect DTMF signals during subscriber interactive testing. As a consequence, to verify the ability of the device to perform these functions, during this diagnostic test, the device is instructed to generate a plurality of DTMF digits (e.g. digits 1, 5, 9 and 0). The signal is routed to an on-board DTMF detector. If the detector is able to correctly identify the digits, the test is passed. If not, it is inferred that either the tone generator is faulty, or the DTMF detector is not performing as required.

6. High Impedance Monitor Tests.

An AC signal (e.g. 577 Hz) is generated by the tone generator circuitry and the signal is routed through (power boost) amplifier circuitry, and the high impedance monitor circuit to the test head. The signal is then measured and compared with a threshold. The purpose of this test is to verify the performance of the power boost amplifier and the high impedance monitor circuit.

7. Capacitance Source Resistor Test.

A plurality of capacitance source resistors are employed by a capacitance measurement circuit. An AC signal (e.g. 30 Hz) is produced by a tone generator and the tone signal is routed through the source resistor to the measurement head, where the measured value is compared with a threshold.

8. Off-hook Circuit Test.

This test serves to determine whether an off-hook detection circuit is capable of detecting an off-hook condition, and also the potential off-hook condition of a test bus. The test initially determines whether the off-hook detector is actually observing an on-hook condition; if so, it causes the loop to be powered-up and inserts a prescribed value termination resistance (e.g. 900 ohm) across the test bus, in order to simulate an off-hook condition, so that the off-hook detector may detect off-hook.

9. Capacitance Test.

The line test and conditioning device in the above referenced application includes a plurality (three) of precision diagnostics capacitors, which can be connected to the test bus by an input/output command. A capacitance measurement routine is then executed and the values of the diagnostics capacitors are measured. The measured values are then compared with their known values. This test determines if the capacitance measurement circuitry is performing as intended.

10. Test Bus Leakage Test.

Normally, a test bus should be open when it is idle and the resistance value of the test bus should approach practical infinity (i.e. the resistance value should be very high, for example, on the order of at least two Megohms). This condition is essential; otherwise any measurements taken on the test bus will be inaccurate. Thus, a resistance measurement is performed on an open and idle test bus. If the resistance is less than a prescribed large value (e.g. two Megohms), the test is failed.

11. Ringer Test.

As described above with reference to FIG. 1A, one of the external stimuli to the test and conditioning device is a ringing voltage signal connected from the remote terminal to the device. This ringing signal is employed when a ringing function is performed on the subscriber loops. It is essential therefore that it be properly installed. The ringing signal is routed to the measurement head and the measured result is compared with a threshold.

12, 13. Modem (also Monitor) Test.

The modem/monitor test is employed to verify that equipment has been properly installed at the remote site. For this purpose, while in its on-hook state, the modem is requested to perform dial tone detection (the result should be the absence of dial tone). The modem then goes off-hook and performs additional dial tone detection (which should be the presence of dial tone).

14, 15. Memory Tests.

As described in the above-referenced co-pending application the test and conditioning device employs two types of memory devices -1) flash memory, and -2) battery backed-up static random access memory. The flash memory system is used to store operating system firmware. The random access memory is a battery back-up memory in which critical system configuration data are stored. The contents of both types of memory devices are subject to cyclic redundancy check (CRC) processing, and therefore their contents can be validate by performing CRC checks on each memory. If the CRC test fails, the diagnostic is declared failed.

As pointed out above, the self diagnostics test routine of FIG. 2 may be executed in a selected one of three modes of operation of the routine: 1- DEMAND; 2-AUTOMATIC; and 3- LOOP. The DEMAND mode of operation is initiated by a system user who logs in to the RMU from an attendant terminal or serial communications device and initiates the test routine as described. Through an attendant display, the results are provided directly to the accessing user. The AUTOMATIC mode of operation is driven by a software timer that has been loaded into the operating system resident in the microcontroller's program memory and is repeatedly executed at periodic intervals (e.g. every twelve hours). The use of the AUTOMATIC mode provides a check of system performance of a sufficiently frequent repetitive basis to obtain a performance profile that not only facilitates troubleshooting, but can reveal a degradation tendency of the system that would otherwise go unnoticed.

The LOOP mode of operation is similar to the AUTOMATIC mode, in that it is driven by a software timer in the operating system resident in the microcontroller's program memory and is repeatedly executed. In the LOOP mode, however, the diagnostics are recycled in an effectively continuous manner (e.g. having an extremely short delay (on the order of several to ten seconds or so) between each run). The LOOP mode may advantageously be employed in the course of manufacturing quality assurance testing to allow for unattended extended cycle testing, while recording all occurrences of intermittent problems prior to shipment of the test device for installation at a remote site. Since LOOP mode testing is intended primarily for production testing, its first and second threshold values are set at values that are more limiting than for the automatic mode (e.g. 6 dB down for each threshold). The purpose of this 'tighter' set of tolerances during LOOP testing ensures that a unit shipped from the factory will have a sufficiently large margin to allow the unit to 'drift' but still provide valid measurement data.

The LOOP mode may be invoked by the toggling of a hardware switch, followed by a system reset, and then continuously running the LOOP mode, until a user logs in, after which the LOOP mode is inhibited (to allow for normal RMU operation). Moreover, since during LOOP mode the test unit is not connected to an external telephone network, there is no telephone line connected for modem or talk circuit testing. Also, there is no −48 volt central office battery connection and no ringing generator connection to the RMU. To accommodate these physical changes, mask bits are set for tests associated with these connections to prevent the non-connections from causing the status word to be set as MARGINAL or FAILED.

It should also be noted that, during LOOP mode, a marginal or failed test recovery back to a passing condition will not cause a previously indicated 'marginal' or 'failed' status to change to 'passed' status. Once a test has failed, it remains failed. Similarly, if a test status is declared marginal, it can only remain marginal or be declared worse (failed), even though subsequent diagnostic runs show a passing status. Maintaining a degraded state indication, once it occurs, reveals the existence of a potential problem, which needs to be addressed and corrected prior to shipment of the equipment.

As will be appreciated from the foregoing description, the present invention successfully obviates the inability of the conventional practice of examining the operational capability of remote telephone test equipment, on a very infrequent basis or otherwise only in the event of a failure, to anticipate a potential problem or provide a performance history that would provide insight to the source of a problem, by testing the operational capability of each of a plurality of prescribed signal processing functions contained within the test device, on a selected one of a 'loop' (effectively continuous) basis, 'automatically'—at a less than continuous but still meaningfully periodic rate, or 'on-demand'—at any time requested by the user. Since the results of each diagnostic test are compared with a set of thresholds associated with respectively different standards of performance of the test device, an informative classification of the operating status of the test unit device is provided to the user as PASS, MARGINAL, or FAIL. In addition, whenever a test diagnostic indicates a less than PASS status, the time and number of occurrences is stored in memory, so as to provide maintenance personnel with a performance anomaly chronology that will facilitate troubleshooting.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with a communication system having one or more remote sites at which respective programmable test devices are located, a respective programmable test device employing processor-controlled testing circuitry having a processor which contains a resident operating system test routine for controllably operating said processor-controlled testing circuitry, so as to cause said programmable test device to monitor and test network lines and subscriber termination equipment coupled thereto, a method of providing a measure of the performance capability of said test device comprising the steps of:

(a) periodically performing diagnostic tests of a plurality of signal processing functions contained within said processor-controlled testing circuitry and, for each diagnostic test performed, generating a signal representative of the result of said each diagnostic test; and (b) comparing each diagnostic test result-representative signal generated in step (a) with an associated plurality of different performance criteria, and generating an output signal representative of the operational capability of said programmable test device, in accordance with whether or not said each diagnostic test result-representative signal generated in step (a) satisfies prescribed relationships with respect to said plurality of different performance criteria; and wherein step (b) comprises comparing each diagnostic test result-representative signal generated in step (a) with first and second performance thresholds, and generating an output signal representative of the operational capability of said programmable test device dependent upon whether said each diagnostic test result-representative signal generated in step (a) exceeds either of said first and second performance thresholds.

2. For use with a communication system having one or more remote sites at which respective programmable test devices are located, a respective programmable test device employing processor-controlled testing circuitry having a processor which contains a resident operating system test routine for controllably operating said processor-controlled testing circuitry, so as to cause said programmable test device to monitor and test network lines and subscriber termination equipment coupled thereto, a method of providing a measure of the performance capability of said programmable test device comprising the steps of:

(a) periodically performing diagnostic tests of a plurality of signal processing functions contained within said processor-controlled testing circuitry and, for each diagnostic test performed, generating a signal representative of the result of said each diagnostic test; and (b) comparing each diagnostic test result-representative signal generated in step (a) with an associated plurality of different performance criteria, and generating an output signal representative of the operational capability of said programmable test device, in accordance with whether or not said each diagnostic test result-representative signal generated in step (a) satisfies prescribed relationships with respect to said associated plurality of different performance criteria; and wherein step (b) comprises comparing each diagnostic test result-representative signal generated in step (a) with a first minimum performance threshold, and generating an output signal representative of a preferred operational capability of said programmable test device, in response to said each diagnostic test result-representative signal generated in step (a) not exceeding said first minimum performance threshold.

3. For use with a communication system having one or more remote sites at which respective programmable test devices are located, a respective programmable test device employing processor-controlled testing circuitry having a processor which contains a resident operating system test routine for controllably operating said processor-controlled testing circuitry, so as to cause said programmable test device to monitor and test network lines and subscriber termination equipment coupled thereto, a method of providing a measure of the performance capability of said programmable test device comprising the steps of:

(a) periodically performing diagnostic tests of a plurality of signal processing functions contained within said processor-controlled testing circuitry and, for each diagnostic test performed, generating a signal representative of the result of said each diagnostic test; and (b) comparing each diagnostic test result-representative signal generated in step (a) with an associated plurality of different performance criteria, and generating an output signal representative of the operational capability of said programmable test device, in accordance with whether or not said each diagnostic test result-representative signal generated in step (a) satisfies prescribed relationships with respect to said associated plurality of different performance criteria; and wherein step (b) comprises comparing each diagnostic test result-representative signal generated in step (a) with first and second performance thresholds, and generating an output signal representative of a marginal operational capability of said programmable test device, in response to any diagnostic test result-representative signal generated in step (a) exceeding said first performance threshold, but not exceeding said second performance threshold.

4. A method according to claim 3, wherein step (b) comprises comparing each diagnostic test result-representative signal generated in step (a) with first and second performance thresholds, and generating an output signal representative of a non-acceptable operational capability of said programmable test device, in response to any diagnostic test result-representative signal generated in step (a) exceeding both said first and second performance thresholds.

5. For use with a communication system having one or more remote sites at which respective programmable test devices are located, a respective programmable test device employing processor-controlled testing circuitry having a processor which contains a resident operating system test routine for controllably operating said processor-controlled testing circuitry, so as to cause said programmable test device to monitor and test network lines and subscriber termination equipment coupled thereto, a method of providing a measure of the performance capability of said programmable test device comprising the steps of:

(a) periodically performing diagnostic tests of a plurality of signal processing functions contained within said processor-controlled testing circuitry and, for each diagnostic test performed, generating a signal representative of the result of said each diagnostic test; and (b) comparing each diagnostic test result-representative signal generated in step (a) with an associated plurality of different performance criteria, and generating an output signal representative of the operational capability of said programmable test device, in accordance with whether or not said each diagnostic test result-representative signal generated in step (a) satisfies prescribed relationships with respect to said associated plurality of different performance criteria; and wherein step (b) comprises comparing each diagnostic test result-representative signal generated in step (a) with first and second performance thresholds, and generating an output signal representative of a non-acceptable operational capability of said programmable test device, in response to any diagnostic test result-representative signal generated in step (a) exceeding both said first and second performance thresholds.

6. For use with a communication system having one or more remote sites at which respective programmable test devices are located, a respective programmable test device employing processor-controlled testing circuitry having a processor which contains a resident operating system test routine for controllably operating said processor-controlled testing circuitry, so as to cause said programmable test device to monitor and test network lines and subscriber termination equipment coupled thereto, a method of providing a measure of the performance capability of said programmable test device comprising the steps of:

(a) periodically performing diagnostic tests of a plurality of signal processing functions contained within said processor-controlled testing circuitry and, for each diagnostic test performed, generating a signal representative of the result of said each diagnostic test; and (b) comparing each diagnostic test result-representative signal generated in step (a) with an associated plurality of different performance criteria, and generating an output signal representative of the operational capability of said programmable test device, in accordance with whether or not said each diagnostic test result-representative signal generated in step (a) satisfies prescribed relationships with respect to said associated plurality of different performance criteria; and wherein step (a) comprises effectively continuously re-performing said diagnostic tests of a plurality of signal processing functions contained within said processor-controlled testing circuitry so as to generate, for each diagnostic test performed, successive signals representative of the result of said each diagnostic test, and wherein step (b) comprises comparing each diagnostic test result-representative signal successively generated in step (a) with an associated plurality of different performance criteria and, for each successive signal, generating an output signal representative of the operational capability of said programmable test device, in accordance with whether or not said each successive diagnostic test result-representative signal generated in step (a) satisfies prescribed relationships with respect to said associated plurality of different performance criteria.

7. A method according to claim 6, wherein step (b) comprises comparing each successive diagnostic test result-representative signal generated in step (a) with first and second performance thresholds and, in response to any successive diagnostic test result-representative signal generated in step (a) exceeding said first performance threshold, but not exceeding said second performance threshold, continuously generating an output signal representative of a marginal operational capability of said probrammable test device, regardless of whether subsequently generated diagnostic test result-representative signals do not exceed said first performance threshold.

8. A method according to claim 6, wherein step (b) comprises comparing each diagnostic test result-representative signal generated in step (a) with first and second performance thresholds, and continuously generating an output signal representative of a non-acceptable operational capability of said programmable test device in response to any diagnostic test result-representative signal generated in step (a) exceeding both said first and second performance thresholds, regardless of whether subsequently generated diagnostic test result-representative signals do not exceed either of said first and second performance thresholds.

9. A method according to claim 6, wherein step (b) comprises maintaining a running count total of the failure of any successive diagnostic test result-representative signal generated in step (a) to satisfy any of said prescribed relationships with respect to said plurality of different performance criteria, and storing the time of occurrence of said failure.

10. For use with a communication system having one or more remote sites at which respective programmable test devices are located, a respective programmable test device employing processor-controlled testing circuitry having a processor which contains a resident operating system test routine for controllably operating said processor-controlled testing circuitry, so as to cause said programmable test device to monitor and test network lines and subscriber termination equipment coupled thereto, a method of providing a measure of the performance capability of said programmable test device comprising the steps of:

(a) repeatedly performing diagnostic tests of a plurality of signal processing functions contained within said processor-controlled testing circuitry and, for each diagnostic test performed, generating a signal representative of the result of said each diagnostic test; and (b) comparing each diagnostic test result-representative signal generated in step (a) with first and second performance thresholds and, in response to any successive diagnostic test result-representative signal generated in step (a) not exceeding said first performance threshold, generating an output signal representative of a preferred performance capability of said programmable test device, but in response to said any successive diagnostic test result-representative signal generated in step (a) exceeding said first performance threshold, but not exceeding said second performance threshold, continuously generating an output signal representative of a marginal operational capability of said programmable test device, regardless of whether a subsequently generated diagnostic test result-representative signal does not exceed said first performance threshold, and continuously generating an output signal representative of a non-acceptable operational capability of said programmable test device in response to any diagnostic test result-representative signal generated in step (a) exceeding both said first and second performance thresholds, regardless of whether a subsequently generated diagnostic test result-representative signal does not exceed either of said first and second performance thresholds.

11. A method according to claim 10, wherein step (b) comprises maintaining a running count total of the failure of any diagnostic test result-representative signal generated in step (a) to satisfy any of said prescribed relationships with respect to said plurality of different performance criteria, and storing the time of occurrence of said failure.

12. For use with a communication system having one or more remote sites at which respective programmable test devices are located, a respective programmable test device employing processor-controlled testing circuitry having a processor which contains a resident operating system test routine for controllably operating said processor-controlled testing circuitry, so as to cause said programmable test device to monitor and test network lines and subscriber termination equipment coupled thereto, a method of providing a measure of the performance capability of said programmable test device comprising the steps of:

(a) providing the capability of selectively performing diagnostic tests of a plurality of signal processing functions contained within said processor-controlled testing circuitry on any one of a demand basis, automatically and repeatedly at a prescribed periodic rate, and in an effectively continuously repeated manner;

(b) performing diagnostic tests of a plurality of signal processing functions contained within said processor-controlled testing circuitry in accordance with a selected one of said demand basis, automatically and repeatedly at a prescribed periodic rate, and in an effectively continuously repeated manner of the capability provided in step (a) and, for each diagnostic test performed, comparing each diagnostic test result-representative signal with an associated plurality of different performance criteria, and generating a signal representative of the result of said each diagnostic test; and (c) generating an output signal representative of the operational capability of said test device, in accordance with whether or not said each diagnostic test result-representative signal generated in step (b) satisfies prescribed relationships with respect to said associated plurality of different performance criteria.

13. A method according to claim 12, wherein step (b) comprises comparing each diagnostic test result-representative signal generated in step (a) with first and second performance thresholds, and wherein step (c) comprises, in response to any diagnostic test result-representative signal generated in step (b) not exceeding said first performance threshold, generating an output signal representative of a preferred performance capability of said programmable test device, but in response to any diagnostic test result-representative signal generated in step (b) exceeding said first performance threshold, but not exceeding said second performance threshold, generating an output signal representative of a marginal operational capability of said programmable test device, and generating an output signal representative of a non-acceptable operational capability of said programmable test device in response to any diagnostic test result-representative signal generated in step (b) exceeding both said first and second performance thresholds.

14. A method according to claim 12, wherein step (c) comprises maintaining a running count total of the failure of any diagnostic test result-representative signal generated in step (b) to satisfy any of said prescribed relationships with respect to said plurality of different performance criteria, and storing the time of occurrence of said failure.

15. A method according to claim 12, further including step (d), in response to a user access to a respective programmable test device during the execution of step (b), terminating execution of steps (b) and (c).

16. A method according to claim 15, further including step (d), in response to a user access to a respective programmable test device during the execution of step (b), interrupting execution of steps (b) and (c) and, thereafter, periodically determining whether said user is continuing to access said respective programmable test device and, in response to determining that said user has discontinued access of said respective programmable test device, returning to the execution of steps (b) and (c).

17. A method according to claim 12, wherein diagnostic tests executed automatically employ performance criteria thresholds that are different than those associated with diagnostic tests executed automatically in said effectively continuously repeated manner.

18. A method according to claim 17, wherein diagnostic tests executed automatically employ performance criteria thresholds that are larger than those associated with diagnostic tests executed automatically in said effectively continuously repeated manner.

* * * * *